United States Patent [19]
Taylor

[11] Patent Number: 5,930,513
[45] Date of Patent: Jul. 27, 1999

[54] REFERENCE BASED SOFTWARE INSTALLATION

[75] Inventor: Julian S. Taylor, Colorado Springs, Colo.

[73] Assignee: Sun Microsystems, Inc., Palo Alto, Calif.

[21] Appl. No.: 08/659,394

[22] Filed: Jun. 6, 1996

[51] Int. Cl.$^6$ .................................................. G06F 17/30
[52] U.S. Cl. .................... 395/712; 395/200.33; 707/1; 707/203; 707/205
[58] Field of Search .............................. 395/712, 200.33, 395/49, 200.43, 651, 652; 707/203, 200, 205, 1, 8; 711/3; 364/243.41, 256.3, 256.6, 256.8, 962, 246.3

[56] References Cited

U.S. PATENT DOCUMENTS

| | | | |
|---|---|---|---|
| 5,175,852 | 12/1992 | Johnson et al. | 707/8 |
| 5,452,447 | 9/1995 | Nelson et al. | 707/205 |
| 5,561,799 | 10/1996 | Khalidi et al. | 707/200 |
| 5,574,898 | 11/1996 | Leblang et al. | 707/1 |
| 5,603,019 | 2/1997 | Kish | 707/205 |
| 5,668,968 | 9/1997 | Wu | 711/3 |
| 5,673,394 | 9/1997 | Fenwick et al. | 395/200.43 |

*Primary Examiner*—Hal Dodge Wachsman
*Attorney, Agent, or Firm*—James A. Pinto; William J. Kubida; Holland & Hart LLP

[57] ABSTRACT

A file system for use in a network computer system has a server file system in the server, which contains at least some file elements to be selectively accessed by the client. An overlay file system is assigned to the client within the server, and contains at least some file elements that have corresponding file elements in the server file system. The overlay file system is configured to provide an overlay file system element to the client when the file element exists in the overlay file system, and to allow access to a server file element when a corresponding file elements does not exist in the overlay file system. Through the use of such file system, a network file system can be configured to allow the client to write to it, with the appearance to the client that it is writing directly to the server file system. The overlay file system permits the installation or updating of software applications to client computers in very little time compared to previous techniques, and enabling the client computers to change or customize their operating environments, particularly those using shared file elements, without the involvement of system operators and without affecting the operations of other client computers.

33 Claims, 4 Drawing Sheets

REFERENCE BASED SOFTWARE INSTALLATION

BACKGROUND OF THE INVENTION

1. Field of the Invention

This invention relates to improvements in computer systems and methods, and more particularly to improvements in computer systems and methods for interfacing server and client computers and for installing computer software and software applications.

2. Relevant Information

In the past, software manufacturers have distributed software products for installation on computer systems on one or more floppy disks. However, as computer programs have become more and more complicated, a greater number of floppy disks have been required to contain the entire software product. As a result, as many software products have reached a size of 800 megabytes or more, the former floppy disk distribution methods have become impractical, and many manufacturers have begun distributing their software products on CD-ROM disks.

As a result of the larger sized computer programs and the concomitant increasing complexity of the programs, the time required for installation of many programs has significantly increased, sometimes requiring an hour, or more, for a single program installation. One of the reasons that software installation consumes so much time is because virtually every bit of information in the program must be transferred from the delivery medium to an operating disk within the computer to which it is installed. Some software products can be installed using parallel information transfer, but others can be effected only by serial transfer techniques, one bit at a time. This is particularly time consuming, especially with some of the larger program products of the type mentioned above. This is especially true, for example, in Ethernet, and other serial network type installations.

In many distributed computer network environments, computer systems are configured in client-server arrangements, in which the present invention has particular utility. Typically, the server computer has a directory hierarchy that is often inflexible with regard to the client computers served by the server. For example, in most UNIX (UNIX is a trademark licensed by X/Open Company Ltd.) based operating systems, typically software products or applications must be installed without crossing the root/usr directory boundary, since /usr is a shared partition. This rigid approach has resulted in the construction of various rules by the operating system manufacturers that further complicates software installation onto server computer systems and which requires more time in effecting the proper application software installation process.

More particularly, in client-server arrangements, the server computer is provided with directories that contain certain information about each of the client computers that is served by the server. Typically, a server may have a number of disks, or disk partitions, which contain a required file system and client information to enable any particular client to perform specified client functions provided by the server. (The term "file system" is used herein to denote the logical file system seen and manipulated by a user.)

More particularly, for example, in a UNIX operating system, a server may provide a file system with portions that are shared by more than one client, portions that are unique to each client, and portions that are not modifiable or accessible by any client. Other operating systems may be similarly constructed. Typically, for example, a UNIX file system on a server includes for each client at least a root directory (/), a system characterization directory (/etc), and a user applications directory (/usr). In addition, an operating system core directory called kernel (/kernel), and other supporting directories are also typically provided, as is known in the art.

The /etc directory generally contains all of the information that characterizes the client computer that is associated with that particular /etc directory. The /etc directory may contain, for example, all of the characterization files that may be associated with a particular software application to be run by the particular client computer. The /etc file may also contain, for instance, a file specifying other client computers with which the client may communicate, passwords for the client's particular applications, boot specifications for the client, and so on.

The /usr directory may contain a collection of subdirectories, including a subdirectory entitled /usr/bin, containing UNIX commands not contained in the /bin subdirectory of the root directory, a subdirectory called /usr/lib, containing most of the remaining UNIX information, and others. Typically, the /usr directory and many of its subdirectories can not be changed or written to by any client due to the fact that it is shared in common by several clients.

In a client-server arrangement where, for example, a large number of clients are connected to a server, the server must provide identification and characterization information for each client that is individualized for each particular client, but must additionally provide access among all of the clients to the information that is common to all of the clients, such as the data in /usr. It can therefore be seen that the job of maintaining the file system for the server and all of its clients can be a challenging and time consuming task.

The most common method for providing server-based file systems to clients is through the use of "Network File System," (hereinafter referred to as NFS). Developed in the mid-1980's by Sun Microsystems, Inc., NFS permits a computer (called a client) to gain access to a file system located on a different computer (called a server) using a local area network, such as Ethernet. Because of the functionality provided by NFS, the client gains access to the file system of the server as though it were a local file system of the client. To the client using NFS, the remote file system appears to be local. The client may, in fact, have no local disk at all; that is, it may be "diskless." Nonetheless, even such a diskless computer may demonstrate full functionality using only the file systems of the server.

Still more particularly, the network file system of the client has an interface to a file system facility (possibly a UNIX file system, UFS) within the server itself. Thus, the client has the illusion that it has a disk, when in fact it may not. The illusory disk appears to contain the root (/) and /usr directories. The area within the server that contains the disk or disk region that appears to be the disk containing data unique to the client is referred to by some unique name, for example, client_1. Other client disks (or disk portions) within the server, for example, client_2, client_3, . . . may be similarly configured.

The disk area within the server, sometimes referred to as the "root area", therefore, contains a number of client regions, each containing individualized root (/), /etc, and /kernel files for each respective client served by the server. The clients, however, all share certain common facilities, with access to particular applications being defined, for example, in the /usr directory. Thus, in general, except for the root area, the directories associated in the server with each client computer are shared and identical, and, therefore, are unmodifiable by the clients. The illusion, therefore, from the client computer perspective is that it has a disk with all of the file systems immediately available on it. It can be observed that among the root (/), /usr, and other characterizing files among the various clients served by the server, only a fraction of the overall information among the different respective files is different. Because of this, certain directories (typically /usr among them) are not duplicated from client to client. There is usually only one /usr directory on the server for use by the clients. This "shared area" (one of perhaps several) is used by all clients in common.

One of the problems of this type system is that the time required to install each client's software is relatively large. If a large number of clients are connected to a single server, the time is multiplied by the number of clients that are served, and may become extremely large. Another problem is that from the view point of the server, it presently is not possible to determine the software made available to each client via the shared areas to which each particular client may be privy.

Additionally, to upgrade any particular client may also take an inordinate amount of time. Typically, for example, an upgrade of a software product entails identifying files that require change, renaming the files to enable a restoration if the upgrade is not successful, then writing an upgraded file in its place. Every file in the file system must be analyzed in order to determine if it is to be upgraded. Thus, typically, an upgrade can take many hours to accomplish, especially with the large files in software products, as mentioned above. Like original software installation, an upgrade installation must also be repeated across each client's root area, still further multiplying the amount of time necessary for the upgrade. Sometimes, in fact, with the installation and removal functions of a upgrade, the process of upgrading a particular software product may even take longer than the original installation of the original software product.

In addition to the time requirements of an upgrade, upgrading software products may be risky. If any particular software in the product is changed, but not detected by a software upgrade, the upgraded system may not operate at all upon completion. In that event, since the upgraded portions of the software must be removed and the original portions reinstalled, if some portion of the original software has been changed, but is unrecorded, the restoration of the original version may not be possible. In such case, typically, the original version must be totally reinstalled and the changed file identified, for example, by reviewing the last backup of the system. In many instances, if an upgrade is attempted, but for some reason is not acceptable to the client, downgrade data to return to the original version are usually not available.

Many software applications maintain a database that contains a list of contents of the particular application. Oftentimes, however, the database becomes damaged, for example, by a power failure, system hardware failure, or other reason, and the access to the various stored data becomes difficult, if not impossible. At that point, again, the original software products must be totally reinstalled.

Often, software application vendors provide "patches" to correct bugs or to modify the software in certain ways. Not only are such patches frequently slow and inefficient, but they may be difficult to perform, and also frequently require large amounts of time to execute. In client-server installations, it is sometimes desired to apply a patch to one particular client, but not another. If the patch must be applied to both the root and shared /usr areas, the other clients see only part of the patch, thereby rendering the patched application useless to the non-patched clients. Moreover, once a patch has been applied incorrectly, often the patch cannot be undone, again resulting in a requirement that the software package be entirely reinstalled. Like upgrades, patches may take as long to install as the original software application.

Still another problem that is encountered in client-server work environments is that although certain clients would like to make various changes in some shared configuration files, they cannot be allowed to do so, since such changes might affect the operation of other clients that are using the shares software on the same server.

What is needed, therefore, is a method for installing software applications or data for use by clients in a stand alone or network environment that can be performed rapidly, can be easily patched, modified, or uninstalled, and that allows individual clients access, without affecting other clients use of the software.

SUMMARY OF THE INVENTION

While the provision of shared areas allows the client to be extremely simple and field replaceable, it requires a large amount of data to pass across a shared network. It also requires the server to spend computing resources on the task of providing the required data to the client or clients over the network. Thus, recently, software products have been introduced which provide for efficient use of file systems provided over a network. An example of such a product is AUTOCLIENT™, available from Sun Microsystems, Inc. Such products allow all of the client computers to share common directories over a network with minimal network and server overhead. When a particular client accesses a file provided by such a network file system, the client reads the data once only and keeps a copy on its local disk for future reference. The data on the server is "cached" on the client significantly reducing network traffic and server load. Even though the data is available from the server, the next time the client reads that data, it will read it from its own local disk.

In light of the above, therefore, according to a broad aspect of the invention, a directory is placed in a common area of an appropriate file system protocol, and at least some of the client computers are allowed to share the single area. In a UNIX file system ("UFS") environment, for instance, the /usr directory may be placed in a common area, which the client computers may share. Then, a virtual or reference client may be defined within the server environment. The reference client appears to the system as if it were a real, existing client, but in fact, it only provides for client configurations and client group definitions. This allows a number of desired software packages to be installed within the server and assigned to the virtual or reference client. Then, the real, external clients of the file systems of the server within the group defined by the virtual or reference client are allowed access to the various programs that have been associated with the reference client. The reference client is used to define a parent file system, which is populated with all of the data that would, in the previously described prior art, be stored in the shared area, as well as the root area of a typical client. It represents a complete client image.

To effect the reference client definition, and according to another broad aspect of the invention, a file system is presented for use in a network computer system that has a server computer and at least one client computer. The file system has a server providing a parent file system, which contains at least some file elements to be selectively accessed by the client computer. An overlay file system is also provided, with individual overlay file systems assigned to respective ones of the clients on the network. The overlay file system contains files that are made available only to a specific client in a data storage area called an "overlay cache." One overlay cache is provided for each corresponding client. At least some file elements of each overlay cache have corresponding file elements in the parent file system. The overlay file system is configured to provide an overlay file system object to the client when that object exists in the overlay cache, and to allow access to a server file system object when a corresponding file system object does not exist in the overlay cache. This is similar to the AUTOCLIENT™ (AUTOCLIENT is a trademark of Sun Microsystems, Inc.) software which uses cache file systems, such that if the data to be read is in the local cache, it is not read over the network from the server.

Individual overlay file system interfaces may be included between the various clients characterized within the server, including the reference client, and the external clients. The is overlay file system, among other things, mediates between the various file system protocols of each client and that of the server. In one embodiment, the overlay file system provides an overlay cache to each of the clients. The overlay cache contains only files that are different in the client from those in the parent file system on the server. Moreover, the various external clients are enabled to write files or other information to the overlay cache. The existence of the overlay cache is transparent to the various clients. The overlay cache appears to the clients as if it were in fact the files of the server. Each of the clients, however, is allowed to write information to the overlay cache, and since the overlay cache appears to the clients to be actually files of the server, which indeed it is not, the clients have the illusion of writing to the files of the server. This is particularly useful since the client is enabled to make virtually whatever modifications to the software as the client may desire; however, the actual server files are never modified.

As a example of the operation of the overlay file system, if a client desires to remove a file contained in the server, he would execute a command based on his particular operating system in place of an "rm" command (assuming a UNIX based operating system) directed to the server to erase the particular file. The change would be recorded only by the overlay file system, and would thereafter appear to the client as if the file had been erased. In fact, the file in the server is unaffected, only the particular region of the overlay file interface has been modified with regard to that individual client, essentially reflecting to that client that the file erased by the client no longer exists. All other clients, however, still have full access to the file "erased" by the erasing client. The end result of this system is that each client has the illusion that it has complete read and write access to the files in the server to which it has previously been given access. A additional ability that may be provided to the individual users or clients is the ability to remove the overlay modifications that it may have made, thereby restoring full access to the files as originally configured within the server's parent file system.

One of the features of the overlay file system becomes apparent when a particular client initially boots up. The client initially is ignorant of how it is characterized, even of its own host ID. The server may have a system identification program that specifically identifies each of the clients initially, and directs the client once identified to its previously defined overlay cache. The client thereafter acquires all of the characterizing information that had been previously defined in its overlay cache by the server.

One of the advantages that is realized by the use of the overlay file system of the present invention is that if a particular software program is updated, the update is made through the reference client only in the parent file system on the server and "slid under" the client's overlay cache. Thus, any particular client can be upgraded in a matter of seconds, rather than requiring hours, according to the software installation techniques of the prior art.

Thus, through the use of the overlay file system of the type herein described, a network file system can be configured to allow a client to write to it with the appearance to the client that it is writing directly to the server file system. The use of an overlay file system of the type described provides many other operating advantages, including enabling the installation or updating of software applications to client computers in very little time, compared to the techniques required in the past, and enabling the client computers to change or customize their operating environments, particularly those using shared file elements, without the involvement of system operators and without affecting the operations of other client computers. Thus, one of the technical advantages achieved by the invention is that the software installation method of the invention enables larger lengthy software programs to be installed rapidly, compared to previous software installation techniques.

According to another broad aspect of the invention, a method for loading a software application onto a computer is presented. In performing the method, an overlay cache is provided for holding executable programs for running by the computer. At least part of the software application to be loaded into the computer is loaded into the overlay cache. The computer is operated to run the part of the software application from the overlay cache, while the software application is continued to be loaded into the computer, for example, in the background. The process may be continued by loading additional parts of the software application into the overlay cache of the computer, and operating the computer to run the additional parts of the program, while continuing to load the software application into the computer.

According to yet another broad aspect of the invention, a method for installing software file elements from a software source to a computer for execution is presented. According to the method, an overlay file system is established. The overlay file system identifies file elements that have been installed to a memory, for example, a hard disk, of the computer. A request for access to a file element is directed through the overlay file system, and if the overlay file system indicates that the file element to which access has been requested has been installed in the memory of the computer, the file element is accessed from the memory of the computer. On the other hand, if the overlay file system indicates that the file element to which access has been requested has not been installed in the memory of the computer, the file element is accessed from the software source.

Other features and advantages of the invention will become apparent to those skilled in the art from the detailed description set forth below when read in conjunction with the accompanying drawings and appended claims.

BRIEF DESCRIPTION OF THE DRAWINGS

The aforementioned and other features and objects of the present invention and the manner of attaining them will become more apparent, and the invention itself will be best understood, by reference to the following description of a preferred embodiment take in conjunction with the accompanying drawings, wherein.

In the various figures of the drawings, like reference numbers are used to denote like or similar parts.

DETAILED DESCRIPTION OF THE PREFERRED EMBODIMENTS

The environment in which the present invention is used encompasses a general distributed computing system, wherein general purpose computers, workstations, or personal computers are connected via communication links of various types in a client-server arrangement, wherein programs and data, many in the form of file system objects (that is to say, self-contained collections of data and attributes accessible via file system operations), are made available by various members of the system for execution and access by other members of the system.

Figure 1:
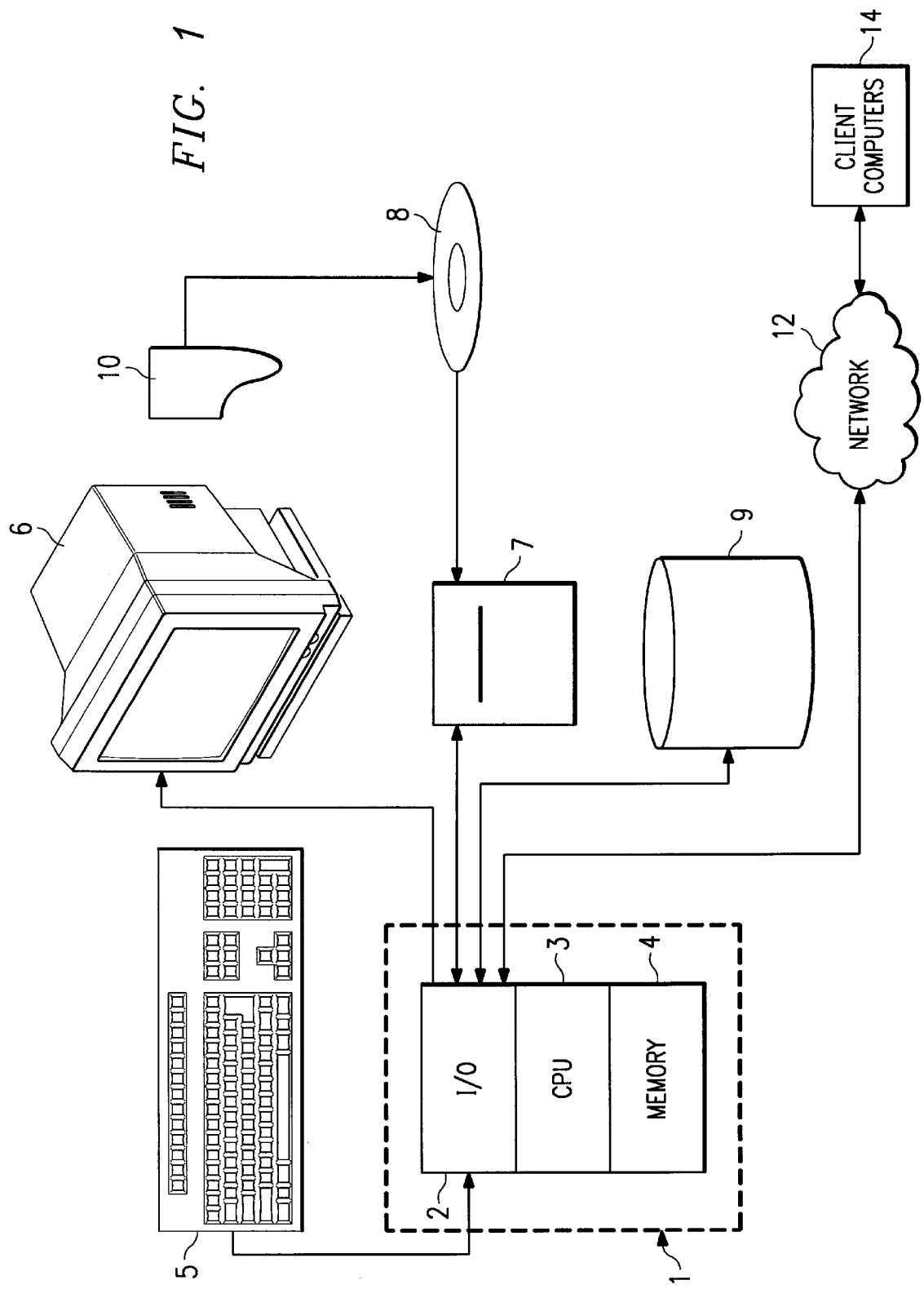
FIG. 1 is a simplified box drawing of a general purpose workstation computer system forming a portion of the operating environment of the invention.

Some of the elements of a general purpose workstation computer are shown in FIG. 1, wherein a processor 1 is shown, having an input/output ("I/O") section 2, a central processing unit ("CPU") 3, and a memory section 4. The I/O section 2 is connected to a keyboard 5, a display unit 6, a disk storage unit 9 and a compact disk read only memory ("CD-ROM") drive unit 7. The CD-ROM unit 7 can read a CD-ROM medium 8, which typically contains programs 10 and data. The computer program products containing mechanisms to effectuate the apparatus and methods of the present invention may reside in the memory section 4, the disk storage unit 9, or the CD-ROM 8 of such a system.

The input/output section 2 includes a communications adapter communicating on a network 12 to remote client stations 14. Examples of computing systems that may be used as either a server or a client include a SPARC™ (SPARC is a trademark of Sun Microsystems, Inc,) system offered by Sun Microsystems™, Incorporated, personal computers offered by IBM Corporation and by other manufacturers of IBM compatible personal computers and systems running operating systems, such as UNIX, OS/2 (OS/2 is a trademark of IBM Corporation), WINDOWSNT™ (WINDOWSNT is a trademark of Microsoft Corporation), and the like. It should be appreciated that although much of the description herein is for a UNIX based operating system, the principles of the invention are equally applicable to such other operating systems, as well, as will be apparent to those skilled in the art.

Figure 2:
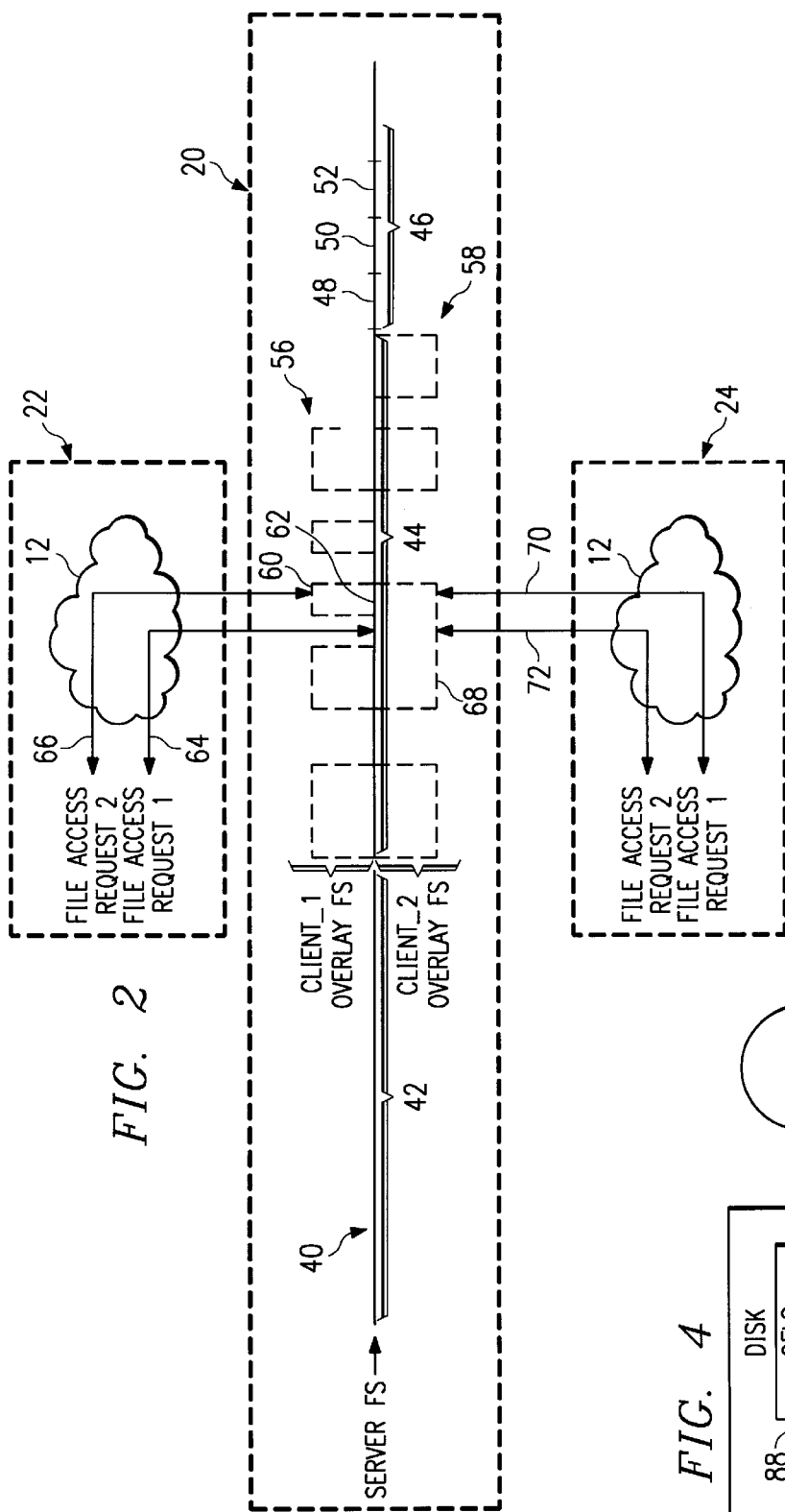
FIG. 2 is a conceptual illustration showing a structure for overlay file systems, according to one aspect of the invention, for two clients associated within a single server file system.

To provide the software application installation advantages, and other advantages provided by the invention, described below in detail, an overlay file system is provided in a server computer. An overlay file system can be viewed schematically as shown in FIG. 2. As shown in FIG. 2, the server computer 20 serves a number of clients, two clients 22 and 24, for example, being shown, although it will be appreciated that any number of clients may be served. Each of the clients 22 and 24 has an overlay cache system 56 and 58 associated with it, located within an overall file system 28 within the server computer 20.

Figure 3:
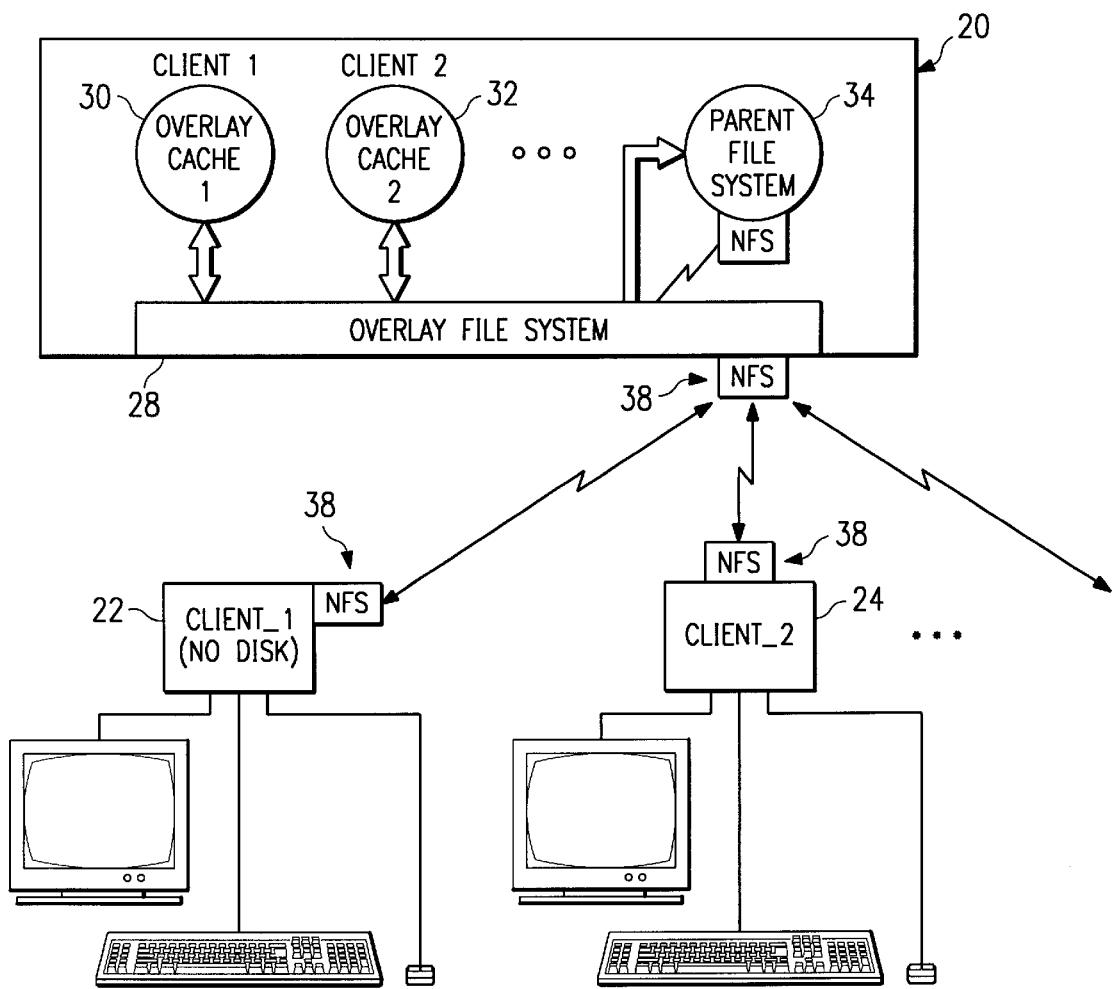
FIG. 3 is an architectural representation of an overlay file system, according to one aspect of the invention, for two clients.

Architecturally, as shown in FIG. 3, for example, client_1 has an overlay cache 30, client_2 has an overlay cache 32, and so on. The various applications 34 provided by the server 20 are selectively shared by each of the clients 22 and 24 "through" their respective overlay file systems. Thus, the overlay file system 28 is configured to provide, together with the individual overlay caches 30 and 32, the complete client file system.

Each of the clients 22 and 24 communicates with the server computer 20 through a network file system 38, which may be a part of an Ethernet or other network communication system. As before, each of the clients 22 and 24 may have its own particular requirements, for example, client_1, 22, may be a diskless client system, and so on. Nevertheless, by virtue of the network connections to the server 20, and the overlay file system provided by the server 20, the diskless client computer system 22 may appear to be a system identical in function and appearance to that of a system having a disk associated with it. Additionally, because of the existence of the overlay file system structure herein described, the client computer systems 22 and 24 will appear to be fully modifiable, as if it were a stand-alone system, yet, having the ability to be rapidly updated or to have software applications rapidly installed thereon simply by augmenting the current parent file system or by providing an additional parent file system.

With reference again to FIG. 2, the "appearance" of an overlay file system to the clients 22 and 24, according to one aspect of the invention, is illustrated. The first client 22 is denoted "CLIENT_1", and the second client 24 is denoted "CLIENT_2". The server file system is denoted by a horizontal line 40. (It should be noted that a computer file system has no physical resemblance to a geometrical line, as it is illustrated, the geometrical representation being shown only to illustrate the conceptual way in which an overlay file system operates.) Thus, from the server's point of view, beginning at the left-most portion of the line 40, all of the files and the organization of files is contained along the horizontal axis of the line 40.

More particularly, the line 40 represents a file system that includes a number of portions or segments. For example, a first segment 42 contains only the files that are used exclusively by the server 20. For example, in a UNIX based operating system, those files may include the /etc directory and its files, the /bin directory and its files, and so on. A second section 44 of the server file system may contain file elements that are shared among the various clients, such as shared applications, and so on. The term "file element" is used herein to denote any software element that is indexed by or as a part of a computer file system. The term "file element" is not intended to be limited to a file system of any particular operating system, and is used in a general sense. The shared elements may include specific applications, shared application portions, and the like. A further section 46 may be further subdivided into individual client regions, such as regions 48, 50, and 52, that may be regions allocated to specific clients which are not shared among the clients. For example, region 48 may contain information pertaining to the specific overlay cache assigned to client_1. The region 48 may also contain other information which is specific to client_1 that would not be shared by the other clients served by the server. Regions 50 and 52 similarly may be assigned to client_2, client_3 (if a third client were existent), and so forth.

According to one aspect of the invention, each of the clients has a unique overlay cache that is associated with it, conceptually represented in FIG. 2 by the dashed line portions 56 and 58. It should be understood that other clients (not shown) may have similar overlay file systems.

In operation, each of the client overlay file systems provide individualized client information that may be differs from the information in the shared segment 44 of the server's file system 40. Thus, for example, if client_1 were to define information, for instance, in segment 60, that is different from the underlying information in segment 62 of the server file system 40, that information would appear in an "opaque" section 60 of the overlay file system 56 allocated to client_1 (client_1's overlay cache). Moreover, the "opaque" section 60 of the overlay file system 56 would obscure that portion of the underlying information in the shared segment 62 of the server file system 40 that underlies the region 60. An example of such information may be, for example, display screen colors that are observed by client_1 that may be different from the "standard" display screen colors for a particular application. Another example may be the contents of a macro that may be executed by particular key stroke by client_1 that is different from a standard macro that would be executed upon normal execution of that particular key stroke.

The number of examples is, of course, manifold, as will be apparent to those skilled in the art.

The operation of the individual client overlays, as shown in FIG. 2, is as implied above. For example, if client_1 makes a file access request, denoted as "file access request 1", that accesses elements of the file system which are not contained in the client_1 overlay file system 56, then corresponding information contained within the server file system 40 would be accessed, as indicated by the arrow 64. On the other hand, if client_1 issues a file access request, denoted "file access request 2", that is contained within its overlay cache 56, indicated by the arrow 66, the information or file elements contained in the overlay cache 56 of client_1 is returned in response to the request. In other words, the overlay cache 56 for client_1 contains regions that are "opaque" with respect to the underlying server file system 40, such that if the information is contained in the client overlay cache 56, that information is returned. If the information is not contained in the client_1 overlay cache 56, the information is returned from the server file system 40.

It will be appreciated that the ability to provide individualized client overlay caches via the action of an overlay file system, among other things, allows each client to individualize its own client apparent file system, and operation of its own computer system. For example, with respect to another client, denoted "CLIENT_2" illustrated in FIG. 2, the same file access requests 1 and 2 as described above with respect to client_1 may result in different information being returned to client_2, since the overlay file system 58 provided for client_2 has different data in its overlay cache 68 overlying the server file system 40. An example of this difference, may be, for instance, different screen or display characteristics associated with a particular application, and so on. Thus, both "file access request 1" 70 and "file access request 2" 72 issued by client_2 would return file elements contained in its overlay cache 68, rather than from the server file system 40. Moreover, to both clients 1 and 2, file elements returned to the clients would appear as if they were being returned merely from the server, with no indication as to whether the file elements were being returned from the respective overlay file system or from the server's parent file system.

By way of clarification, it should be noted that with respect to FIG. 2, neither client_1 nor client_2 are the "reference client" as described above. The reference client for the system shown in FIG. 2 is the mechanism responsible for writing the original data to the parent file system 44. An attempt to read data from the reference client will reveal only the "default" values placed directly onto the parent file system.

Any given server may accommodate multiple reference clients, each responsible for defining a single parent file system, or multiple parent file systems, for use by various clients serving different functions. For example, a reference client could define a parent file system containing an operating system plus accounting software for use by an accounting department. Another reference client could define a parent file system with an operating system plus electrical design software for use by an engineering department. The reference client appears like any other client except that it writes directly to the parent file system rather than to a private overlay cache.

It should be noted that although various overlay file systems have been employed in the past, one of the characteristics of the overlay file system according to the present invention is that it has only a single layer corresponding to a single overlay cache per client. More particularly, a request for access to any particular file element results either in a return directly from the server file system or from a single-layered segment of the overlay file system created for the particular client making the request. Moreover, each overlay file system has the capability of being unique for each client.

Once the overlay file system of the type described has been established, one of its uses may be for rapid software installation for clients of the server. The software installation may be performed in a number of ways, some of which are described herein below. As an example, if a new client were to be added to the network controlled by the server, it would simply be directed to use a particular overlay cache reserved for it by the server with respect to a particular parent file system. The server would then write specific characterization files to the new client's overlay cache, and when the new client booted, it would be fully installed.

Thus, it will be seen that one of the characteristics of the overlay file systems, according to the invention, is that each client can individually modify its own file elements represented in its own overlay cache, without regard to the impact of that modification upon other clients in the network of the server. For example, if any particular client, for example, client_1, desired to modify the response of a particular application, client_1 would be permitted to make the modification. Heretofore, for example, the types of changes to a software application permitted to any particular client were severely limited, since the impact of any modification upon other clients was unknown. Modifications in the past, in contrast to those now enabled, were limited to those that were implemented by a system administrator or person having the appropriate privilege or control over the file system. As mentioned above, however, any modification made by any particular client is not actually made to the file system of the server (the parent file system), but is made to the client's own overlay cache.

For example, if "CLIENT_1", illustrated in FIG. 2, wished to make a modification (write data to the file system), the modification would be made to its overlay file system 56 and not to the server file system 40. The appearance, however, seen by client_1 in making such modification, would be that it were making the modification to the server file system, although, as indicated, the server file system 40 would be unaffected by the modification. As a consequence, client_2 would not see the modification made by client_1, but would see the server file system 40 through the opaque filter of its own overlay file system 58. Thus, each client can be permitted to "augment, remove, or modify" the software of the server file system, without affecting the operation of any of the other clients on the network of the server.

Figure 4:
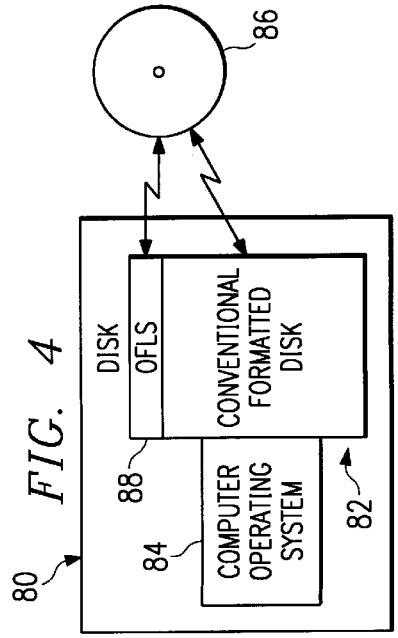
FIG. 4 is a block diagram of a single computer system using a CD-ROM to install a software application, using an overlay file system, according to one embodiment of the invention.

One of the powerful advantages that is derived from the provision of an overlay file system of the type described is in the installation of software onto the server and ultimately for the benefit of the clients on the network of the server. In fact, in a simple case, the overlay file system concept can be advantageously employed in a single computer environment in which a network is not directly involved. An example of such installation system and method is illustrated in FIGS. 3 and 4. As shown in FIG. 4, a computer system 80 has a hard disk 82, together with a computer operating system 84. It is desired that software, for example, from a CD-ROM 86, be installed onto the hard drive or disk 82. The method by which it is installed according to this aspect of the invention is illustrated in the flow diagram of FIGS. 5 to 7.

Initially, an overlay file system 88 is created on the hard drive 82. The overlay file system 88 may simply include an overlay cache for the purpose of executing transitory software, since the software on the delivery medium (CD-ROM 86) is usually compressed, it cannot be executed directly. Thus, each time a file element is written onto the disk 82 from the CD-ROM 86, that fact is known to the overlay file system 88, which has access to its underlying parent, as indicated by the box 90 in FIG. 5. Immediately upon the beginning of the software installation (and preceding that, in fact, if the application on the delivery medium (the CD-ROM 86) is so equipped), any application can be run by the computer operating system 84 by temporarily installing it to the overlay cache. Thus, with the background elements properly established, the entire application installation can be performed in the background, as indicated by the box 92 illustrated in FIG. 5, with all programs being apparently immediately executable during that installation.

More particularly, assuming that the application or file elements are accessible directly from the CD-ROM 86, and that the computer operating system 84 is operating the software provided on the CD-ROM 86, as the background installation of the software on the CD-ROM 86 is being effected, as each file element is installed onto the disk 82, the overlay file system 88 serves as an overlay cache using the entire CD-ROM as a parent file system. This gives the illusion that the entire product is installed, when in fact, the actual installation is only underway. During the installation, the user can be configuring the product. Alternatively, additional intelligence could be provided whereby the configuration data is stored in the overlay cache. Once installation is complete, the configuration can be permanently written to disk for future use.

Figure 5:
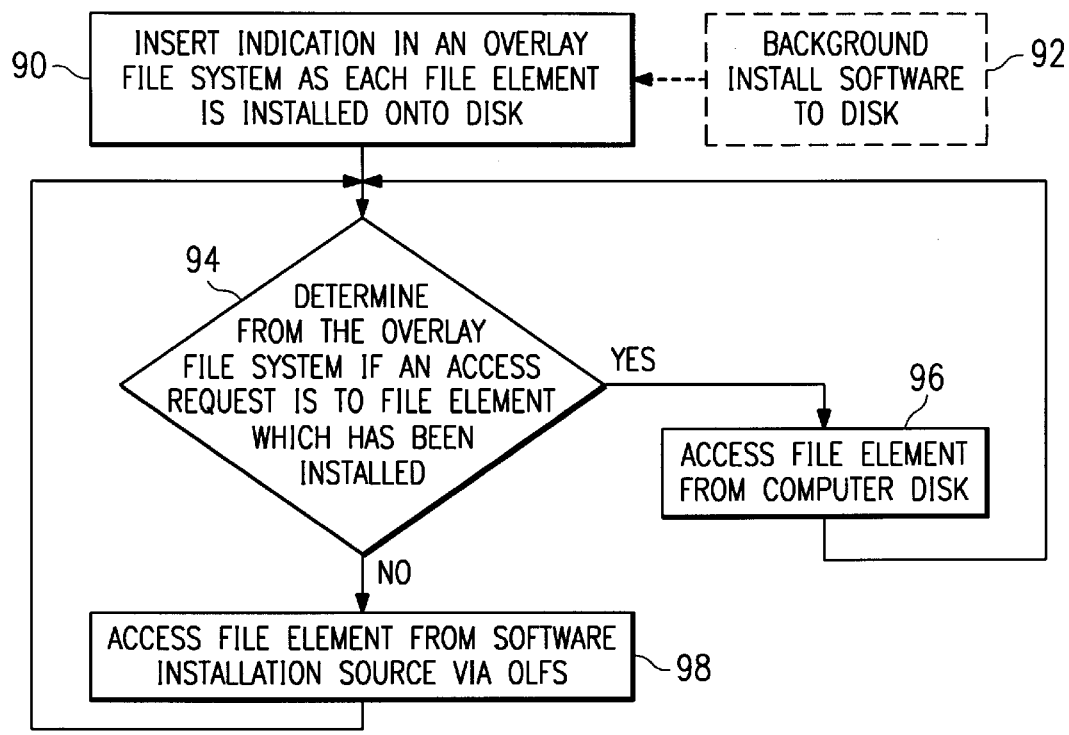
FIG. 5 is a flow chart showing the steps in installing a software application to the computer system of FIG. 4.

As shown in FIG. 5, a determination is made for each file element access request as to whether it has been already written to the disk 82, as indicated by the decision diamond 94. If the file element has already been written to the disk 82, it may be accessed directly from the computer disk, as indicated by the box 96. On the other hand, if the file element has not been installed onto the disk 82, as indicated by the overlay file system 88, the access to the file element is made from the CD-ROM 86 via the overlay cache, as indicated by the box 98. The overlay file system provides a seamless illusion of a single collection of files.

It will be appreciated that through the use of the overlay file system 88 in the manner described above, a particular software application can be run immediately, even during its installation, without a requirement that the application be completely installed onto the disk 82 of the computer 80 prior to its actually being run. This particular aspect of the invention, therefore, minimizes the installation time impact with respect to any particular software. (Although the time required for the actual physical installation of the software in this embodiment of the invention is not affected, the apparent or virtual time as seen by the user is essentially zero.)

Although the installation of the software application contained on the CD-ROM 86 has been described as being under the control of a single computer system 80 in FIG. 4, it will be appreciated that the installation of the software contained on the CD-ROM 86 may be performed by a separate computer, which may or may not be a server computer, onto the computer system 80. The result would, of course, be the same, in which the target computer 80 is enabled almost immediately to begin running the software contained on the CD-ROM 86 as it is being installed in the background.

Moreover, in a network environment, the use of an overlay file system for the installation of software can be even further advantageously performed. As noted above, for example, to install software to any particular client on the network of the server requires only the designation of a parent file system and a new overlay cache for the particular client to be enabled to run the new software. Thus, with reference now to FIG. 6, to bring a new user on-line requires only that a reference client be selected or chosen, box 100. It is noted that the reference client may not actually be in physical existence, but may be a "virtual" client defined within the server.

The parent file system of the reference client is then made available to the target or new client 102. A dozen or so characterization files are written to the new client's overlay cache 103. The target client may then begin immediate operation, box 104, with immediate access to the portions of the server's file system via the parent's file system created with the reference client and with access to the specialized characterization files found in the new client's overlay cache.

As indicated above, one of the major problems encountered in the past, particularly in UNIX based systems, is that new or modified software installation is particularly time consuming, especially when the installation is spread out over a number of clients. Using the overlay file system technique of software installation, as indicated above with respect to establishing a new client, it can be seen that by defining a "virtual" reference client within the server, and installing the software to the hypothetical or virtual reference client, the software may be installed first to the server, then made available to each client via NFS and overlay file system. Once the software has been satisfactorily installed to the reference client, thereafter, any additional client that requires access to the particular software can have its unique view of its file system "constructed" by the overlay file system from the existing parent file systems on the server, thereby reducing the installation time to each client to that necessary only to write the characterization files to its overlay cache, not requiring an entire individualized software installation.

Conversely, if any particular client were to desire to deinstall a software application or other software elements that had previously been installed to it overwriting the parent file system, the portion of the overlay file system associated with that particular software installation can easily be removed, since the underlying server file system 40 is never actually modified by any of the users. Thus, not only is the installation time for any particular software application reduced to a minimum, but the deinstallation of any particular client software application or file elements can be easily done, to immediately restore the original version underlying the overlay file system.

Thus, "reference based" software installation provides a method by which software products may be distributed to a large number of clients. To effect a wide software installation, "client groups" may be defined by specific reference clients, and clients inserted into those groups. Each client group will contain a definition of a particular set of products and services which will be made available to all the members of that group. For example, one group may be running SOLARIS 2.4, SUPERPROJECT, and some accounting package. Another group may be running SOLARIS 2.5 and COMPUTERVISION CAD software. Still another group may be serving as guinea pigs for an experimental operating system, and so on. Each client group is defined through its "reference client", which is the only client that sees a regular installation process.

It can be seen that the "reference client" may serve a number of purposes and provides a number of advantages. It provides a legitimate client to which software installation utilities, such as "pkgadd" in a UNIX environment, may install. Pkgadd, for example, is not guaranteed to work when the target is just a directory. One of the advantages that is realized by the use of the overlay file system of the present invention is that if a particular software program is updated, the update is made only in the parent file system and "slid under" the overlay. Thus, any particular client or client group can be upgraded in a matter of seconds, rather than requiring hours or even days, according to the software installation techniques of the prior art.

The reference client provides a true representation of the configuration of the member clients in that group. This guarantees that if the package refuses to install to the reference client, it would have failed on the member clients as well. The reference client provides a repository for the group definition for quick reference by the administrative software. Also, the reference client simplifies software product administration, particularly when conflicts exist between installed packages and in instances of differing architectures among different clients.

Figures 6, 7:
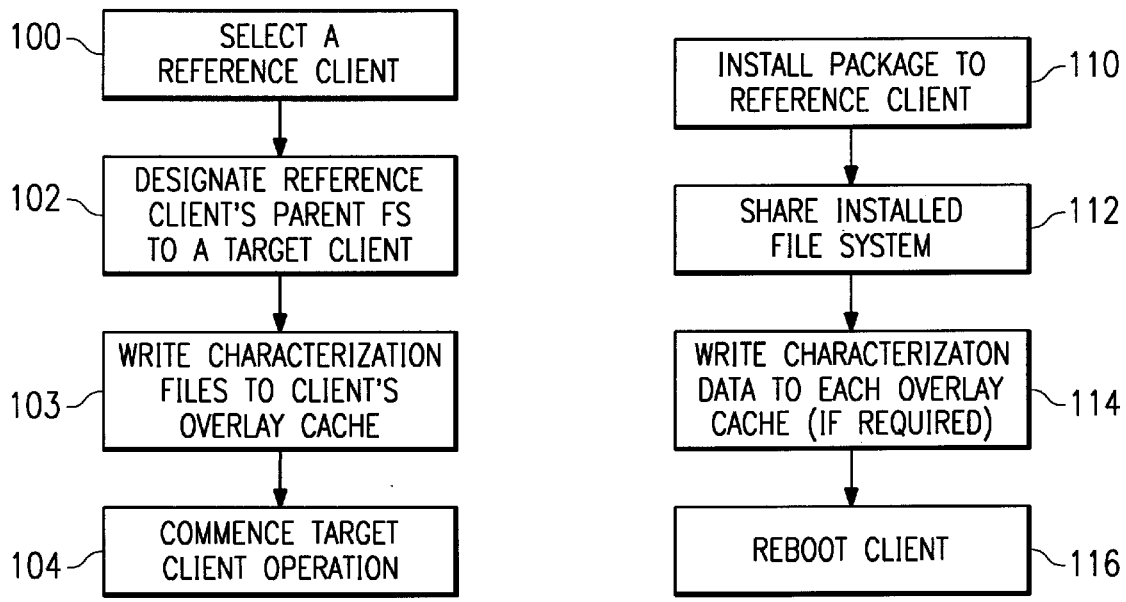
FIG. 6 is a flow chart showing a process for installing a software application to a client using a reference client defined within a server computer system, according to one embodiment of the invention.
FIG. 7 is a flow chart showing a process for installing a package to a client in a client group, using a reference client defined within a server computer system, according to another embodiment of the invention.

Through the use of an overlay file system and reference client of the types described, the transition from one group to another requires seconds, not minutes; and the transition back is just as simple. The installation of any number of clients with an identical architecture and version of a particular package, therefore, can be very rapidly accomplished. A minimum method such as the following, therefore, can be employed, as shown in FIG. 7. Install the package to the reference client 110. Share the installed file system 112. If required, write characterization data to each overlay cache 114. And reboot each client when convenient 116.

This method of installation also gives the client and server identical views of the client's file system. Typically, current methods hide the client's /usr partition from the server. Attempts to "pkgadd" a third-party package that crosses the root/usr boundary will result in a potentially corrupt client root directory. In any event at least two "pkgadd"s will be required to install the package to the first client (once to the shared area and one to the root area, with a few rm -r's required for cleanup).

The area to which the reference client writes is a parent image of the product, whether Solaris, database software, a CAD system, or the like. Since the reference client looks just like a real client, packages that perform target file system checks (such as FRAMEMAKER™ (FRAMEMAKER is a trademark of Frame Technology Corporation) will install without complications. The fact that the reference client matches the characteristics of the other clients in its group assures that the individual group members will be capable of using the package correctly.

Since both server and client see a complete image of the installed software on each client, "pkginfo" on the client will provide a complete list of usable packages. Whether these packages are installed on the client or in the parent area or on an /opt server, the complete list of shared packages will be available for review.

The reference based client, moreover, also facilitates a stand alone operation, particularly for diskless clients, enabling the server to determine or allocate the level of resources granted to the client. For example, if the client is granted 50 Megabytes of file space on the server, the client can be permitted "apparent" read/write access to the entire file system via an overlay file system. This gives the client the versatility of a stand alone computer system with relatively large apparent file capabilities, yet allows the centralized administration of the diskless client. The client has the apparent image of a stand alone and the illusion that he is working on a stand alone, but has the ability to switch product releases with a single reboot. Meanwhile the administrator manages it on the server like a simple client.

Thus, it will be appreciated that all intelligence relating to the assembly of the client image is contained on the server. This is not intertwined with caches and the client software is administrable from the server.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer system having a server computer and an associated client computer in a network configuration, comprising:

a server file system on said server computer containing at least some file elements to be selectively accessed by said client computer;

an overlay file system assigned to said client computer, said overlay file system containing at least some file elements that have corresponding file elements in said server file system, and being configured to provide an overlay file system element to said client computer when the file element exists in said overlay file system, and to allow access to a server file element when a corresponding file element does not exist in said overlay file system, wherein said overlay file system element is modifiable from the perspective of the client without modifying the corresponding server file element.

2. The computer system of claim 1 wherein said overlay file system is configured to allow said client computer to write to an overlay cache in place of said server file system.

3. The computer system of claim 1 further comprising a plurality of client computers and a respective plurality of overlay caches, each associated with a respective one of said client computers.

4. The computer system of claim 3 wherein said overlay file system is configured to control access by said plurality of client computers to shared file elements of said server file system.

5. The computer system of claim 1 wherein said overlay file system is configured as a part of said server file system.

6. A computer implemented method for installing software file elements from a software source to a computer for execution, comprising the steps of:

establishing an overlay file system, containing an identification of file elements that have been installed to a memory of said computer;

directing a request for access for a file element through said overlay file system;

if said overlay file system indicates that said file element to which access has been requested has been installed in said memory of said computer, accessing said file element from said memory of said computer;

and if said overlay file system indicates that said file element to which access has been requested has not been installed in said memory of said computer, accessing said file element from said software source concurrently with an installation of said file element.

7. The computer implemented method of claim 6 further comprising installing said software file elements from a CD-ROM.

8. A computer implemented method for installing software file elements from a software source to a computer for execution, comprising the steps of:

providing for establishing an overlay file system for holding executable programs, and containing an identification of file elements that have been installed to a memory of said computer;

providing for directing a request for access to a first file element through said overlay file system;

providing for, if said overlay file system indicates that said first file element to which access has been requested has been installed in said memory of said computer, accessing said first file element from said memory of said computer;

and providing for, if said overlay file system indicates that said first file element to which access has been requested has not been installed in said memory of said computer, accessing said first file element from said software source.

9. The computer implemented method of claim 8 further comprising providing for installing software file elements from a CD-ROM.

10. A computer implemented method for accessing data, comprising:

providing a first file system responsive to data access commands;

providing a client modifiable second file system;

said second file system being configured to access said data according to said first file system to a client, except as said second file system has been modified by said client in which any portion of second file system that has been modified by said client obscures said first file system and allows said client to access said data according to said modified portion of said second file system in response to said file system commands.

11. A computer program product comprising:

a computer useable medium and computer readable code embodied on said computer useable medium for causing a software application to be installed by a control computer onto a target computer from a software application containing medium, said software application including a number of file elements, the computer readable code comprising:

computer readable program code devices configured to cause the control computer to effect the creation of an overlay file system for the target computer;

computer readable program code devices configured to cause said control computer to effect an installation of said software application onto said target computer;

computer readable program code devices configured to cause said control computer to effect a file element access by said target computer from said target computer concurrently with said installation of said software application if said overlay file system indicates that said file element has been installed on said target computer; and computer readable program code devices configured to cause said control computer to effect a file element access by said target computer from said software application containing medium concurrently with said installation of said software application if said overlay file system indicates that said file element has not been installed on said target computer.

12. The computer program product of claim 11 wherein said control and target computers are the same computer.

13. The computer program product of claim 11 wherein said computer readable program code devices configured to cause the control computer to effect the creation of an overlay file system for the target computer are configured to cause the control computer to effect the creation of the overlay file system on the target computer.

14. The computer program product of claim 11 wherein said software application containing medium is a CD-ROM.

15. A computer implemented method for file system control residing on a server computer in a computer network, comprising the steps of:

providing for maintaining a server file system held by said server computer containing at least some file elements to be selectively accessed by a client computer;

providing for establishing an overlay file system for holding executable programs to be run on said client computer, said overlay file system assigned to said client computer with at least some file elements that have corresponding file elements in said server file system;

providing for accessing an overlay file system element when the file element exists in said overlay file system;

providing for accessing a server file element when a corresponding file element does not exist in said overlay file system.

16. The computer implemented method of claim 15 further comprising the step of providing for configuring said overlay file system to allow said client computer to modify file elements of said overlay file system in place of file elements of said server file system.

17. The computer implemented method of claim 15 further comprising the steps of providing for establishing a plurality of overlay file systems, and providing for assigning a plurality of client computers each to a respective one of a plurality of overlay file systems.

18. The computer implemented method of claim 17 further comprising the step of providing for selective access by said plurality of client computers to shared file elements of said server file system, under the control of said respective plurality of overlay file systems.

19. The computer implemented method of claim 15 further comprising the step of providing for configuring said overlay file system as a part of said server file system.

20. A computer implemented method for file system control on a server computer in a computer network, comprising the steps of:

maintaining a server file system on said server computer containing at least some file elements to be selectively accessed by a client computer;

establishing an overlay file system assigned to said client computer with at least some file elements having corresponding executable file elements in said server file system;

accessing an overlay file system element when the file element exists in said overlay file system; and accessing a server file element when a corresponding file element does not exist in said overlay file system.

21. The computer implemented method of claim 20 further comprising the step of configuring said overlay file system to allow said client computer to modify file elements of said overlay file system in place of file elements of said server file system.

22. The computer implemented method of claim 20 further comprising the steps of establishing a plurality of overlay file systems, and assigning a plurality of client computers each to a respective one of a plurality of overlay file systems.

23. The computer implemented method of claim 22 further comprising the step of selective access by said plurality of client computers to shared file elements of said server file system, under the control of said respective plurality of overlay file systems.

24. The computer implemented method of claim 20 further comprising the step of configuring said overlay file system as a part of said server file system.

25. The computer implemented method of claim 24 wherein said overlay file system is a part of a private region on said server file system assigned to said client computer.

26. A computer system, comprising:

a parent memory area;

an overlay memory area for storing executable programs for running on the computer system;

and an operating system for operating said parent memory area and said overlay memory area so that when data is read which is present on the overlay memory area, only data residing on the overlay memory area is retrieved, when data is read which resides only on the parent memory area, the data which resides on the parent memory area is retrieved, and when data is written, it is written to the overlay memory area only.

27. The computer system of claim 26 wherein said operating system is an operating system supporting multiple users connected over a network.

28. The computer system of claim 26 further comprising a server computer and a client computer, and wherein at least said parent memory area is contained in said server computer.

29. The computer system of claim 26 further comprising a server computer and a client computer, and wherein both said parent memory area and said overlay memory area are contained in said server computer.

30. The computer system of claim 26 further comprising a server computer and a client computer, and wherein both said parent memory area and said overlay memory area are contained in said server computer, and wherein only said client and said server computers can write to said overlay memory area, and only said server computer can write to said parent memory area.

31. The computer system of claim 26 further comprising a server computer and a client computer, and wherein both said parent memory area and said overlay memory area are contained in said server computer, and wherein said overlay memory area appears to said client computer as a single data source contained in said server computer.

32. A computer system, comprising:

a server computer;

a plurality of client computers;

a file system resident in said server computer, said file system including a set of public files containing application packages, and a plurality of sets of private files, each of said plurality of sets of private files being accessible by a respective specified one of said client computers, said set of private files at least establishing a set of individual computer characterizing parameters for said specified one of said client computers;

a virtual client computer configured within said server computer and to which said set of public files is installed;

and at least one external client computer operatively coupled to said server computer and to said virtual computer, wherein said at least one external client computer has access to a set of said private files within said server and also has access to said public files installed on said virtual client computer.

33. The computer system of claim 32 wherein said file system is defined by an operating system supporting multiple users connected over a network.

* * * * *

UNITED STATES PATENT AND TRADEMARK OFFICE
CERTIFICATE OF CORRECTION

PATENT NO. : 5,930,513
DATED : July 27, 1999
INVENTOR(S) : Julian S. Taylor

It is certified that error appears in the above-identified patent and that said Letters Patent is hereby corrected as shown below:

Column 15, line 19, change "wherein said overlay" to
    --wherein said plurality of said overlay--

Column 15, line 31, change "directing a request for access for a file element" to
    --directing a request for access to a file element--

Signed and Sealed this

Twenty-second Day of February, 2000

Attest:

Q. TODD DICKINSON

*Attesting Officer*    *Commissioner of Patents and Trademarks*